(12) United States Patent
Ditt et al.

(10) Patent No.: US 7,110,616 B2
(45) Date of Patent: Sep. 19, 2006

(54) DEVICE FOR PROCESSING IMAGES, IN PARTICULAR MEDICAL IMAGES

(75) Inventors: Hendrik Ditt, Höchstadt (DE); Norbert Rahn, Forchheim (DE); Siegfried Wach, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 768 days.

(21) Appl. No.: 10/225,538

(22) Filed: Aug. 22, 2002

(65) Prior Publication Data

US 2003/0053668 A1    Mar. 20, 2003

(30) Foreign Application Priority Data

Aug. 22, 2001   (DE)   ................ 101 41 186

(51) Int. Cl.
*G06K 9/36*   (2006.01)
(52) U.S. Cl. .............. 382/284; 382/168; 382/270; 382/274; 382/294; 345/581; 345/629; 345/690; 348/239; 348/584; 348/659; 348/671
(58) Field of Classification Search ........ 382/168–172, 382/284, 285, 270, 273, 274, 294, 254; 345/629–641, 345/20, 63, 77, 581–620, 690–697; 348/239, 348/584, 598, 659, 671–678, 686, 702
See application file for complete search history.

(56) References Cited

U.S. PATENT DOCUMENTS 5,042,077 A    8/1991  Burke ................... 382/51
5,590,261 A *  12/1996 Sclaroff et al. .......... 382/284
5,621,817 A *  4/1997  Bozinovic et al. ........ 382/189
5,828,793 A *  10/1998 Mann .................... 382/284
6,229,550 B1 * 5/2001  Gloudemans et al. ..... 345/641

FOREIGN PATENT DOCUMENTS

DE    199 49 877 A1    4/2001

OTHER PUBLICATIONS

Bloch et al, IEEE Publication, 1997, "Estimation of class membership functions for grey-level based image fusion". (pp. 268-271).*
James D. Foley et al., "Computer Graphics Principles and Practice", Addison-Wesley, 1996, pp. 835-843.

* cited by examiner

*Primary Examiner*—Bhavesh M. Mehta
*Assistant Examiner*—Manav Seth
(74) *Attorney, Agent, or Firm*—Young & Thompson (57) ABSTRACT

A device for generating fusion images by fusioning two images, in particular medical images, comprising an image-processing computation unit (2) for fusioning the images, as well as a monitor (3) connected thereto for image output, a gray-value histogram (7, I, II) being displayable on the monitor (3) for each image of the images to be fusioned, which device is designed in such a way that, in each gray-value histogram (7, I, II) of the images to be fusioned, one or more gray-value ranges can be selected by user-controlled highlighting of one or more markings (8) on the monitor (3), as well as for generating the fusion image with the aid of the selected gray-value ranges.

23 Claims, 3 Drawing Sheets

DEVICE FOR PROCESSING IMAGES, IN PARTICULAR MEDICAL IMAGES

FIELD OF THE INVENTION

The invention relates to a device for processing images, in particular medical images, a gray-value histogram being displayable on a monitor for an image.

BACKGROUND OF THE INVENTION

Especially in the field of medicine, image fusion methods are being used for better diagnosis of a possible pathological state. The purpose of image fusion is to combine and visually overlay medical images or image series of a patient, which contain supplementary information to one another. The method most commonly used at present for visually overlaying image series or images is so-called alpha blending. In this case, the gray values of the two images or image series are weighted with a blending factor (alpha value) and the weighted average value of the two images to be fusioned is represented for each image point. By varying the alpha value, it is possible to vary the relative weighting of the images or image series in relation to one another. Discrimination of the two fusioned images or image series in the fusion image output on a monitor is possible, in particular, whenever the respective relevant data of two image series contain anatomically separable image ranges, for example the skull cap in a CT picture combined with the brain tissue in an MR picture.

If the data are not anatomically separable, however, then the image data are "mixed" by the alpha blending. On the one hand, the information about which of the two image series the individual pixels to be represented belong to is lost by the mixing. But since the images or image series to be fusioned are often complementary, and therefore contain different information to be interpreted, information about the membership of individual image points or image ranges is very important. Furthermore, a significant contrast reduction occurs for each pixel of the fusion image owing to the blending of the two original gray values. This means that the alpha blending generates a relatively low-contrast—compared with a separate representation of the two images or image series to be fusioned—visualization of the two images or image series to be fusioned. The contrast loss due to alpha blending is a problem for interpretation of the image data in the fusion image. Difficulties arise, in particular, whenever images that have been recorded in the same mode are to be fusioned, for example two CT pictures which show the same anatomical area. As a rule, the gray-value distributions in these pictures are very similar, or approximately equal. Sensible alpha blending, which leads to a meaningful fusion image, cannot be generated here.

One known way of avoiding the problem of contrast reduction caused by the mixing of gray values in alpha blending consists in using a so-called "threshold mode" for blending of the two images or image series over one another. In this case, only image data of the first image or of the first image series which lie in a particular predeterminable gray-value range are visualized first. The image data of the second image series in another predeterminable gray-value range which is disjoint from the first gray-value range, that is to say it differs significantly therefrom, are then drawn over the already represented image data of the first image series, without blending, that is to say without mixing. The boundary between the two gray-value ranges is set by a so-called "threshold value". The alpha blending is hence replaced in the threshold mode by an overlay of image data, although the image ranges to be overlaid must necessarily lie in disjoint gray-value ranges.

This recording of disjoint gray-value ranges, which is a prerequisite for using the threshold mode with a single threshold value, however, is not feasible whenever two images or image series to be fusioned are similar to one another in terms of their gray-value distribution. This is the case, in particular, whenever the two image series to be fusioned have been generated by the same modality, that is to say using the same recording instrument.

Such "intramodality fusions", that is to say fusions of images recorded with the same instrument, are often carried out for procedural monitoring (for example to monitor tumor growth or to monitor the success of a medication). In this case, the relevant images of the image series to be fusioned lie in the same anatomical range and in the same gray-value range. The threshold mode is therefore equally unusable here (no disjoint gray-value ranges) as alpha blending is (contrast reduction and mixing of the gray values, which the observer can then no longer assign to one of the two images or image series).

From "FOLEY, J. D. et al.: Computer Graphics-Principles and Practice, Addison-Wesley, 1996, pages 835–834" it is known to provide different regions of an image with different alpha values. Basically, standard alpha blending in the scope of image fusion is described therein. DE 199 49 877 A1 describes the principle of 3-D visualization by volume rendering. This primarily involves determining a transfer function for the volume rendering algorithm. The volume rendering principle does not relate to fusioned image data or to alpha blending. Lastly, U.S. Pat. No. 5,042,077 A describes the nonlinear windowing of an image.

SUMMARY OF THE INVENTION

It is therefore an object of the invention to provide an image-processing device which permits meaningful generation of a fusion image, irrespective of the actual gray-value distribution of two images or image series to be fusioned.

To achieve this object, a device is provided for generating fusion images by fusioning two images, in particular medical images, comprising an image-processing computation unit for fusioning the images, as well as a monitor connected thereto for image output, a gray-value histogram being displayable on the monitor for each image of the images to be fusioned, which device is designed in such a way that, in each gray-value histogram of the images to be fusioned, one or more gray-value ranges can be selected by user-controlled highlighting of one or more markings on the monitor, as well as for generating the fusion image with the aid of the selected gray-value ranges, of the type mentioned in the introduction. The invention provides that, inside the gray-value histogram, one or more gray-value ranges can be selected by user-controlled highlighting of one or more markings on the monitor, and they can be modified by means of the marking for a subsequent fusion with a second image, which generates a fusion image.

The device according to the invention permits the user, for example the doctor, to modify an image to be fusioned with another image in such a way that fusion which leads to a meaningful fusion image is possible. To that end, it is possible for the user to mark arbitrary gray-value ranges inside the gray-value histogram of an image to be fusioned—and this naturally also applies to an image series to be fusioned—by highlighting a marking by which a specific gray-value range is defined. He or she can now modify this gray-value range with the aid of the marking, in such a way that fusion with a second image is logically possible. The nature of the modification is in this case variable, as will be discussed in more detail below. In any event, the gray-value histogram of one of the images to be fusioned, or the image series, can thereby be changed in such a way that fusioning based on alpha blending and/or on a threshold mode with another image or another image series is possible, even though this would not lead to a meaningful fusion image without the modification.

A geometrical shape may in this case be highlightable in the gray-value histogram, a rectangle or a trapezium being expediently useful here.

In the scope of the modification, for example, a selected gray-value range that has been defined by means of the marking may be shifted inside the gray-value histogram. This means that it is possible for a gray-value range, which for example represents a particular anatomical structure in the actual image, to be shifted to arbitrary other gray values inside the histogram. By means of this, for example, it is conceivable to generate disjoint gray-value ranges which can then be expediently fusioned using known fusion methods.

In the event of shifting, different case constellations inside the modified gray-value histogram are conceivable. On the one hand, it is possible to shift the selected gray-value range into a range of the histogram in which no gray values are present. In such a case, only the gray values of the shifted gray-value range can be taken into account for the fusion. All other gray values which may also be present can in this case remain ignored since, because of the marking, a particular gray-value range to be fusioned has been defined. Besides this, it is conceivable that, in the event of a shift of the selected gray-value range into a range of the gray-value histogram in which gray values are already present, the existing gray values are overwritten by those of the shifted gray-value range. In this case, the gray values of the marked and selected histogram range hence are given priority over the gray values already existing at the shift location.

Lastly, in the event of a shift of the selected gray-value range into a range where other gray values are already present, provision may be made for the existing gray values to be mixed with those of the shifted gray-value range. To that end, it is conceivable for the original gray values already lying at the shift location to be marked in a corresponding marking, so as to define precisely which gray-value ranges are now to be mixed.

It is furthermore conceivable according to the invention for resealing of the selected gray-value range to be possible by means of the highlightable markings, for example the rectangle. To that end, the rectangle can have its height varied. If, for example, the highlighted rectangle is higher than the highest distribution value of the histogram curve lying in the rectangle, then it remains at the original scaling, that is to say the gray values are represented in the original intensity and distribution. If the rectangle is pulled down or highlighted lower, then the curve profile inside the rectangle is compromised if the rectangle height falls below the highest gray-value distribution value. It is conceivable, for example, to rescale the gray-value range, for example to 70 or 50% of the original range, which in turn has an effect on the subsequent fusion image.

It is particularly expedient for the gray-value histograms of both images to be fusioned to be displayable on the monitor. This is advantageous, on the one hand, to the extent that the marking in a histogram can naturally been matched better to the gray-value distribution of the other histogram.

On the other hand, it is naturally also possible to set corresponding markings in both histograms and hence to modify both histograms just by setting the marking, so that the final fusion image can be generated quasi arbitrarily. This means that at least one marking, which is then image-specific, can be highlighted in each of the two gray-value histograms.

If the two histograms are represented together—this may be done such that the two curves are drawn either in two separate diagrams or together in one diagram—then in the event of a marking highlighted in only one gray-value histogram, provision may be made for only the gray values of the selected range of the specific image to be representable in the fusion image that can be output. This means that only these selected gray values will be drawn in full, that is to say unmixed intensity. This results from the image specificity of the highlighted marking, that is to say it serves to define that only the selected gray values in the respective gray-value range will be represented, and all others—even those of the second histogram—will be not be drawn.

In the event of optionally further markings highlighted in both gray-value histograms, according to the invention the respective gray values of the respectively marked gray-value ranges will be represented in the fusion image, so long as the ranges do not overlap. For example, if a gray-value range between 1,000 and 1,500 is defined in one histogram, and a gray-value range between 3,000 and 3,500 is defined in the other histogram, then only these two ranges will be shown in the fusion image, and all other gray values will be suppressed. In the event of an overlap between two gray-value ranges marked in the two gray-value histograms, according to the invention gray-value mixed values are generated from the gray values present in the overlap range, and these can be output in the fusion image. This means that this overlap of the defined ranges leads to mixing, that is to say alpha blending, in this range. The non-overlapping ranges lying alongside will all be represented respectively in full intensity and unmixed. In this case, it is very expedient, in the event of overlapping trapezoidal markings, if the weighting of the respective individual gray values to be mixed is dependent on the ratio of the two trapezium sides in the overlap range at the respective gray value. This means that the alpha value which defines the ratio in which the gray values of the individual histograms are to be mixed in the overlap range is dictated by the profile of the respective trapezium sides. The alpha value, and therefore the alpha blending, is consequently variable inside this overlap range.

The above mixing takes place whenever gray-value ranges that are highlighted in the two different histograms overlap. However, if gray-value ranges which are marked in the same gray-value histogram overlap, then the gray-value values of the overlapping ranges will be represented unmixed, the intensity to be represented being dictated only by the profile of one of the markings, for example the profile of a trapezium side. Expediently, the respectively higher trapezium is used for this.

Concerning the respectively displayed histogram or histograms, different cases are conceivable. On the one hand, the histograms of the respectively fully recorded image or of the image series may respectively be indicated. Besides this, however, it is also conceivable for an image section to be selectable in the first and/or second image that can be displayed on the monitor, the gray-value histogram of which section can subsequently be displayed on the monitor and modified, and it can be fusioned with a corresponding image section of the respective other image. This means that, in a two-dimensional image representation, the user selects an ROI (region of interest) or, in a three-dimensional representation, the user selects a VOI (volume of interest), for which he or she wishes to have histograms displayed. Inside these, he or she can then carry out the modifications as described, and only these image sections will be fusioned with one another in the fusion image.

To further improve the quality of the representation of the fusioned data, or in order to generate an impression for the user that the two image data to be fusioned have been fused to give a new series, it is expedient if a first and/or second image to be fusioned are rotated relative to one another by an angle of from 4° to 10°, in particular from 6° to 8°, and can be output offset by a few centimeters intermittently on the monitor. According to this configuration of the invention, the stereo effect is used with respect to the image representation, by respectively providing an image or an image series which has previously been correspondingly modified on the right stereo channel, and providing the second image to be fusioned, or the second image series, optionally also modified, on the left stereo channel of the stereo hardware. These are output intermittently in the fastest possible sequence, and then the observer perceives a spatial representation with a three-dimensional effect on the monitor. So that a greater similarity of the image data to be fusioned can be simulated for the observing eyes, it is furthermore conceivable for the first and/or the second image to be a fusion image generated from a previous fusion of two images weighted arbitrarily with respect to one another. According to this configuration of the invention, for example, an already fusioned visualization may be provided on the left stereo channel, that is to say an already fusioned first image with, for example, a 30% proportion of the original first image to be fusioned, or of an image series, and a 70% proportion of the original second image, of the image series. A "prefusioned" visualization is subsequently provided on the right stereo channel, with a 70% proportion of the first original image, or of an image series, and a 30% proportion of the second original image, or of the image series.

A further expedient way of representing the modified images, which permits a unique allocation of the image points to the first or to the second image to be fusioned, is to represent two images to be fusioned in alternation on the monitor. According to this configuration of the invention, the two images are hence overlaid successively, that is to say a constantly alternating, quasi "flashing" changing representation is carried out. Besides this, it is naturally also conceivable to represent not the two entire images, but rather only particular selected gray-value ranges or particular anatomical structures, depending on the way in which the user has modified the individual images.

As an alternative to the "flashing", alternating representation, it is also conceivable for two images to be fusioned to be slid over one another in alternation on the monitor. In this case, the frequency of the alternating image representation may be selectable, both for flashing and for sliding over one another. This also applies to the slide-over direction. For example, the images may be slid over one another from top to bottom or from left to right, and it is also conceivable to overlay a new image on the old one starting from the edges. It is furthermore conceivable to stop the alternating representation at an arbitrary time while retaining the current representation, that is to quasi freeze the current representation.

BRIEF DESCRIPTION OF THE DRAWING

Further advantages, features and details of the invention are given in the exemplary embodiments described below, and with the aid of the drawings, in which.

DETAILED DESCRIPTION OF THE INVENTION

Figure 1:
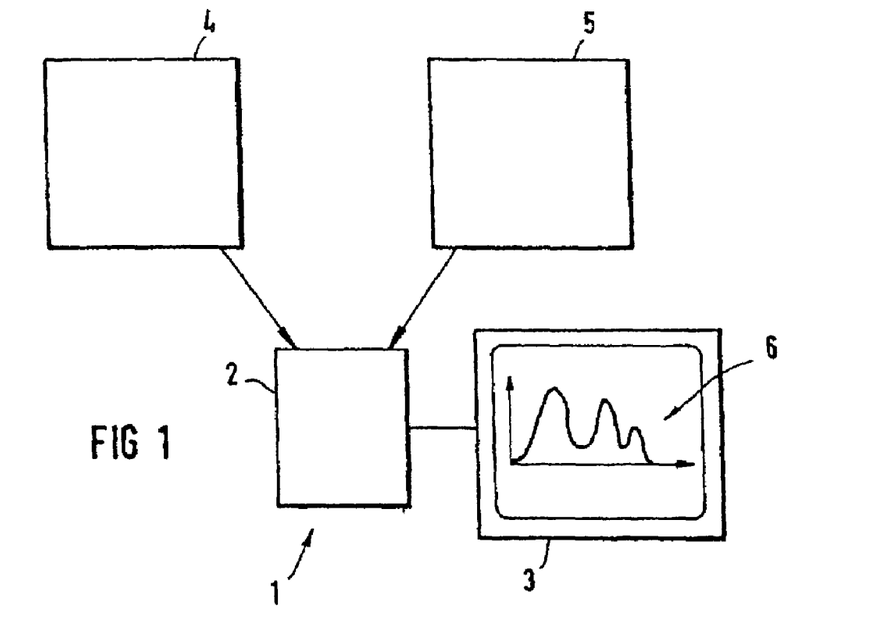
FIG. 1 shows an outline diagram of a device according to the invention for processing images.

FIG. 1 shows, in the form of an outline diagram, a device 1 according to the invention for processing images. This device comprises an image-processing computation unit 2 and the monitor 3, on which images and other information can be displayed. In the exemplary embodiment which is shown, the image-processing computation unit 2 contains images which have been recorded using two different recording devices, for example a computer topography instrument 4 and a magnetic resonance instrument 5, and which are to be overlaid. On the monitor 3, it is now possible to represent gray-value histograms 6 for the individual images or image series. The user can modify these gray-value histograms by highlighting markings, so that a meaningful fusion of various images or image series is possible. This will discussed in more detail below. The fusion of the images is carried out by the image-processing computation unit, the fusion result being subsequently output in turn on the monitor 3. Of course, with a correspondingly large monitor, for example, the two individual images to be fusioned may be represented in one monitor range, the fusion image may be represented in one monitor range, and the gray-value histogram or histograms which are assigned to the original images may be represented in a third monitor range, so that the entire process is transparent for the user.

In particular in the case of images or image series to be fusioned whose gray-value ranges do not differ, alpha blending is not sufficient for visualization of the fusioned image data, since the user can no longer assign the individual image points of the fusioned representation to the original image series. The threshold mode, with the purpose of visually overlaying various gray-value ranges of the image series or images to be fusioned, is likewise inapplicable for image data which do not contain disjoint gray-value ranges. With the image-processing device according to the invention, however, it is now possible to modify the gray-value range or a gray-value subrange of the images or image series to be fusioned, in such a way that the two image series contain disjoint gray-value ranges and can hence be overlaid with the aid of the threshold mode.

Figure 2:
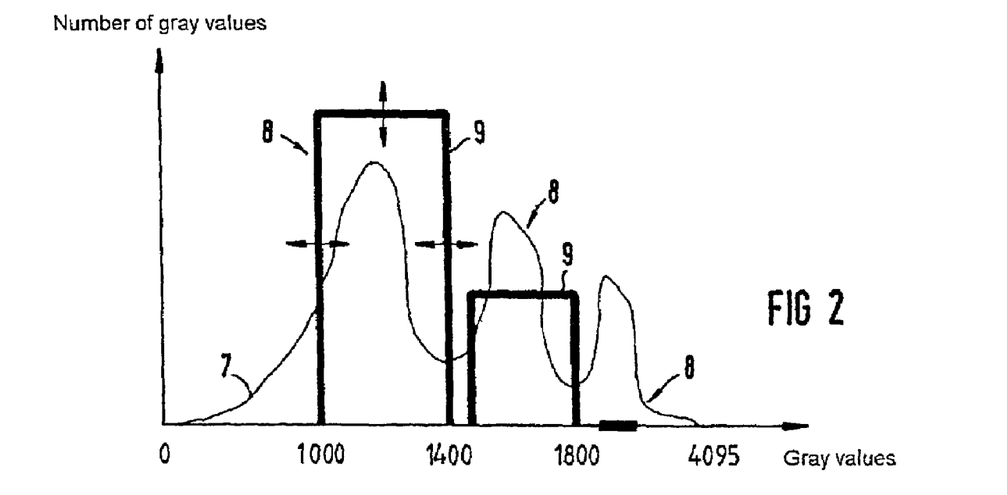
FIG. 2 shows a gray-value histogram with different highlighted rectangular markings.

The modification of a gray-value histogram is carried out with the aid of markings which the user can highlight in the histogram. A first example of a modification is shown by FIG. 2. It represents a histogram 7, the gray values, for example from 0 to 65,535, being plotted along the abscissa, and the number of gray values being plotted along the ordinate. Various rectangles 9 are highlighted here as markings 8, and a further marking 8 lies directly on the abscissa. The width of the rectangle 9 respectively indicates the starting and the ending gray value of the gray-value range to be marked. The width of the rectangle can be varied interactively by the user. For example, the left-hand rectangle 9 in FIG. 2 marks the gray-value range that contains gray values from 1,000 to 1,400, the middle rectangle 2 marks a range that contains the gray values from 1,500 to 1,800 and, as described, the third marking 8 lies on the abscissa and, for example, excludes the gray-value range relating thereto.

The height of a highlighted rectangle, or of such a marking, is set by default to the normalized value 1. A value of 1 indicates that the gray-value range identified by the rectangle is to have its scaling preserved. The height of the rectangle can also be varied interactively by the user, so that the scaling of the identified gray-value range can be changed, as will be discussed in more detail below.

By highlighting these rectangles, it is hence possible, for example, to label an arbitrary number of gray-value ranges inside the histogram. For example, it may then be possible to observe only this marked gray-value range in the subsequent image fusion, all other gray-value ranges of this image or of this image series being fully excluded, for example. It is also conceivable for the image points contained in a rectangle to be correspondingly labeled in color.

Figure 3:
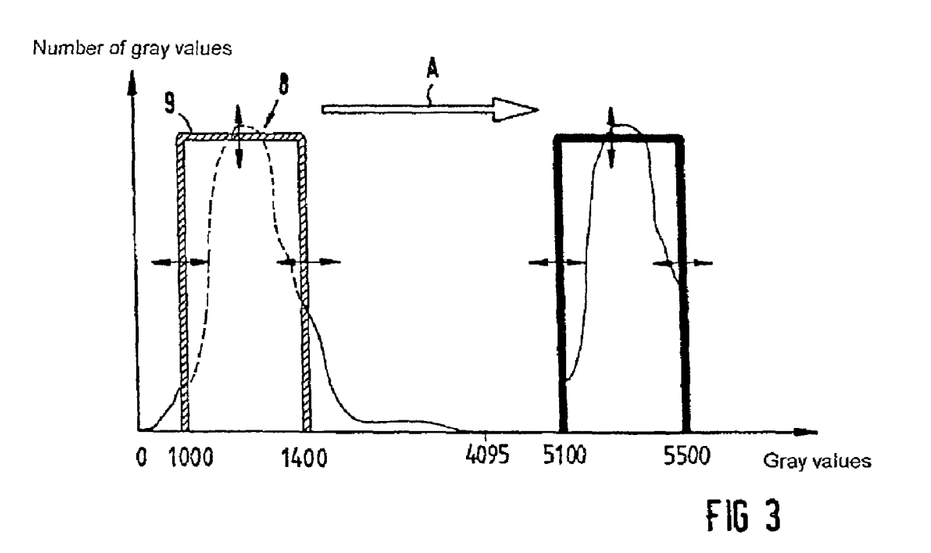
FIG. 3 shows a gray-value histogram to represent the shifting of a gray-value range.

FIG. 3 shows the possibility of shifting a gray-value range, labeled by a marking 8 in the form of a rectangle 9, inside the histogram. Shown on the left, and represented by shading, is the originally highlighted rectangle 9 before the shift, as well as the histogram curve enclosed by the rectangle, which is now only shown by dashes. This marked range is now shifted along the shift arrow A to higher gray values. For example, the original gray-value interval extends between 1,000 and 1,400. This range is now shifted to the gray-value interval 5,100 to 5,500. In this case, as shown in FIG. 3, on the one hand the case is conceivable that the target gray-value range of the shift does not previously contain gray values of this image or of this image series. In this case, the image information whose gray-value range has been identified by the highlighted rectangle is shifted by the horizontal shift of the rectangle to the new location of the data record. No gray values are therefore present any longer in the original gray-value range. Instead, the same image information now lies in the newly generated gray-value range from 5,100 to 5,500.

Figure 4:
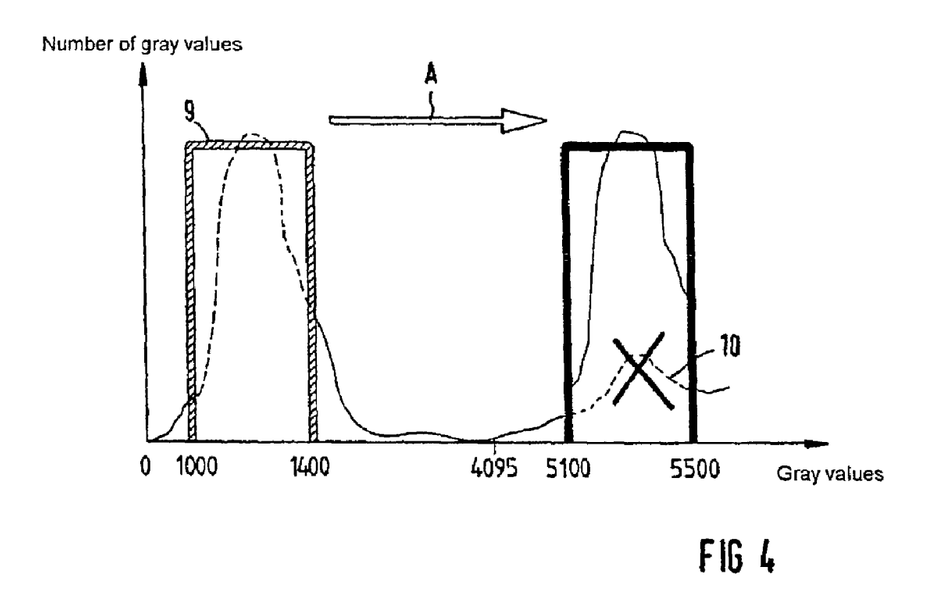
FIG. 4 shows a gray-value histogram to represent the shifting of a gray-value range into a gray-value range where gray values are already present.

FIG. 4 shows a second case constellation. Here, the gray-value range defined by means of the originally highlighted rectangle 9, also only represented by shading here, is shifted along the shift arrow A into a gray-value range where gray values are already present, as shown by the dashed histogram curve section 10. According to the method of FIG. 4, the image information lying at the shift location is now overwritten with the shifted gray values. This means that the original gray values are no longer present after the overwriting, and they can no longer be represented. This is represented by the highlighted "X".

Figure 5:
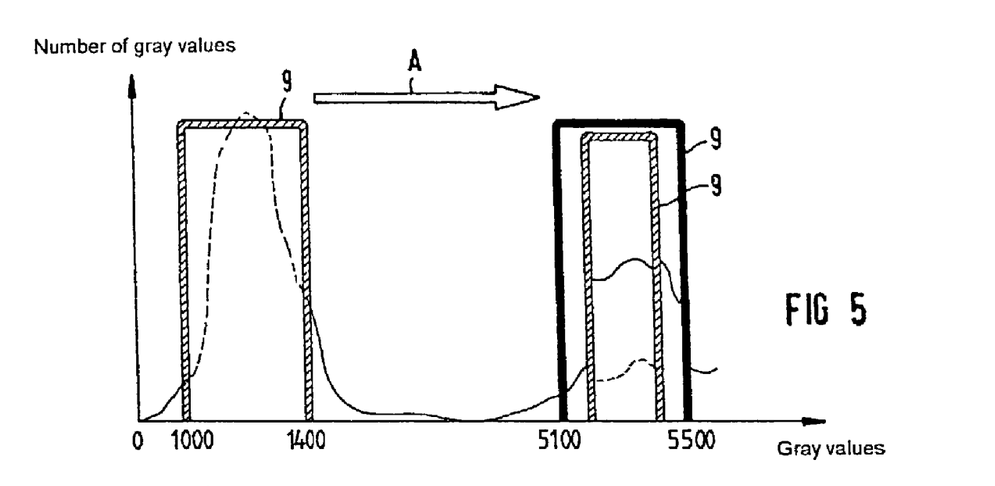
FIG. 5 shows a gray-value histogram to represent the shifting of a gray-value range into a gray-value range where gray values that are to be mixed with one another are already present.

Conversely, FIG. 5 shows a further alternative, which is conceivable in a case constellation where gray values are present at the shift location. In this case, on the one hand, the gray-value range between 1,000 and 1,400, which is to be shifted, is defined by a rectangle 9 (only represented by shading). It is shifted along the shift arrow A, and the shifted rectangle is represented by the solid rectangular line. A second rectangle 9 is furthermore highlighted in the target gray-value range between 5,100 and 5,500, and it defines a particular gray-value range at the target position (for example likewise from 5,100 to 5,500 (the rectangle in FIG. 3 being shown narrower for the sake of clarity)). After the two gray-value ranges have now been defined by means of separate rectangles 9, the possibility now exists of mixing together all gray values now lying in the target range, that is to say the original ones and the ones shifted into it. The mixing ratio is obtained from the degree of overlap of the rectangular ranges, which is in turn determined by the width and the height of the respective rectangles. If they are of equal size, then they will be mixed as 50:50, for example.

The shift hence likewise permits straightforward formation of disjoint gray-value ranges, which can subsequently be processed in a corresponding fusion mode.

Figure 6:
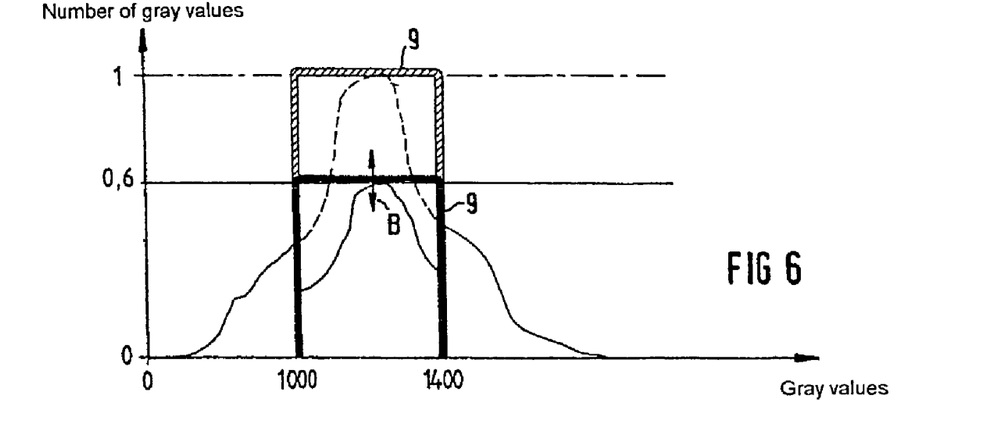
FIG. 6 shows a gray-value histogram to represent the possibility of rescaling a selected gray-value range.

FIG. 6 lastly shows, in the form of a histogram, the possibility of rescaling a particular gray-value range with the aid of the modification according to the invention. In the example which is shown, a rectangle 9, which is here represented only by shading, is highlighted in the histogram in the value range from 1,000 to 1,400. As can be seen, the original rectangle 9 ends essentially flush with the highest peak of the histogram in this gray-value range. In the unaltered state, the rectangle is provided with the normalized height 1, that is to say the image has a normalized scaling of 1.0 in the unmodified state. After the rectangle 9 has been highlighted, it is now possible to modify this scaling, that is to say the weight of the gray-value range which is identified by the rectangle, relative to the normalized scaling. The modification is carried out by simply changing the rectangle height. To that end, the upper rectangle edge is pulled down, as indicated by the double arrow B. By setting the height of this rectangle to the value 0, that is to say when it is pulled down onto the abscissa, this gray-value range is completely excluded. In this way, by using several rectangles and suitable scaling, it is possible to carry out interactive multithreshold segmentation of the gray values of an image series, since the histogram can be arbitrarily altered, shifted and rescaled.

In the example shown according to FIG. 6, the original gray-value range from 1,000 to 1,400 has been rescaled from 100% (normalization value 1) to 60% (corresponding to a normalization value of 0.6). An image modified by this gray-value scaling, or an image series, can now be used for fusion with a second image to be fusioned, or another image series.

In this case, it should be noted that it is, of course, also conceivable to carry out corresponding modifications as desired in the second image or in the second image series.

Figure 7:
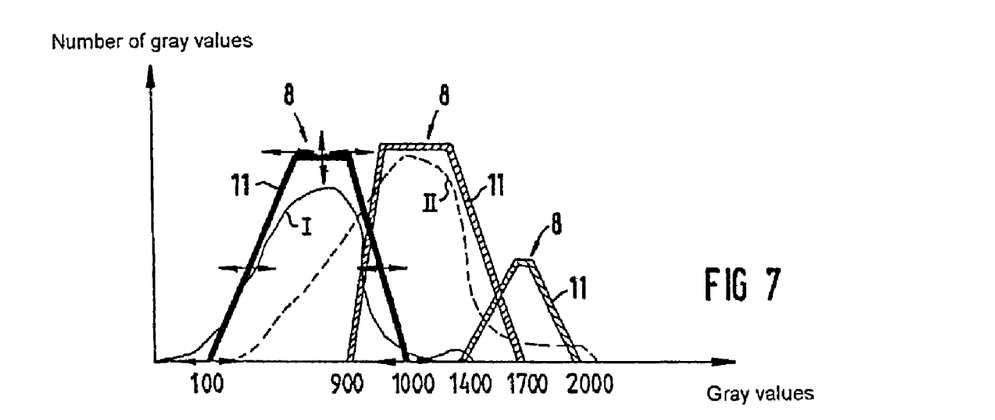
FIG. 7 shows a representation of two gray-value histograms of different images or image series with various highlighted markings.

FIG. 7 now describes the configuration of an intuitive user interface on the monitor, as well as the related functionality, with the aid of which the user can easily alter parameterizations of the alpha blending mode and of the threshold mode, and a combination of the two modes. In particular, it is possible for the user, with the aid of this user interface which shows the two histograms of two images or image series to be overlaid, to blend an arbitrary number of different gray-value ranges of the two images or image series to be fusioned, with different alpha values (=selective alpha blending mode), or produce a threshold mode with an arbitrary number of thresholds (=multithreshold mode), as well as a combination of a selective alpha-blending mode and a multithreshold mode. In this case, either original images or original series from imaging recording instruments, such as CT or MR instruments, or images or image series which have been modified with the possibilities described in FIGS. 2 to 6, are used as images or image series to be fusioned.

Here as well, the described functionality is produced by simply working with a freely selectable number of markings 8, here in the form of trapeziums 11, which can be arbitrarily set, shifted and vertically scaled inside the respective histogram.

The alpha blending mode currently implemented as the state of the art makes it possible to mix the entire gray-value ranges of two image series to be mixed, the alpha value indicating the mixing ratio. When mixing the entire gray-value range of both images or image series, those gray-value subranges are mixed for which the observer is interested not in the mixing of the gray values, but rather in the original gray values of one of the two image series to be fusioned. It is likewise interesting from the user's point of view for various gray-value subranges of both image series to be fusioned to be mixed with different mixing ratios, and with different alpha values. In the threshold mode which is likewise used at present, a threshold value is employed to decide which gray values of which of the two image series to be fusioned will be drawn in the fusioned representation. In practice, difficulties are often encountered in identifying two such interesting gray-value ranges, and setting them by a single threshold. It would be substantially more expedient to identify an arbitrary number of different gray-value subranges in gray-value histograms of the two images or image series to be fusioned, which can be included or excluded on the basis of a user action.

The device according to the invention accommodates these requirements, as will be clarified with the aid of FIG. 7. The user selects an arbitrary number of different gray-value ranges of the images or image series to be fusioned by inserting trapeziums, which respectively identify gray-value ranges of one of the two images or image series to be fusioned. These trapeziums are hence image-specific or image-series-specific, that is to say a trapezium relates to the gray values of either the first or the second image to be fusioned, or of the corresponding image series. The membership of a trapezium—and naturally of a rectangle, in the event that rectangles are used—to the respective image series can be illustrated by color-coding of the trapeziums. The width, the height and the slope of the sides of the trapeziums can be modified arbitrarily by the user. All the modifications are effected online on the display of the fusioned images, which may for example be displayed alongside in parallel on the monitor.

Overall, four different cases of the functionality represented in FIG. 7 are to be distinguished.

1.:
Gray-value subranges of the combined gray-value histogram (which hence shows the gray-value histograms of both images) in which no trapeziums are highlighted:

These gray-value subranges will be treated as completely excluded, that is to say no gray values from either of the images to be fusioned will be drawn in the fusioned image representation if they lie in these gray-value ranges.

2.:
Gray-value ranges of the combined gray-value histogram of the two images in which only one marking is highlighted, that is to say only one trapezium, which is assigned to one of the two images to be fusioned:

So long as the trapezium has a height>0, the gray values of the image or image series to which the trapezium is assigned will be drawn at 100%, that is to say unmixed and with full intensity, in the fusioned representation of the two image series. Neither the height nor the slope of the trapezium sides will be interpreted in this case.

3.:
Gray-value ranges of the combined gray-value histogram of the two images or image series, in which two trapeziums that are assigned to different image series are highlighted:

In this gray-value range, genuine alpha blending will be carried out; the alpha value may be varied as a function of the trapezium sides. The alpha blending value is obtained, for each gray value of the gray-value histogram of the two images or image series to be fusioned, from the ratio of the two trapezium heights, or from the ratio of the height of the two trapezium sides.

4.:
Gray-value ranges of the combined gray-value histogram of the two images or image series, in which two trapeziums that are assigned to the same image series or to the same image are highlighted:

The trapeziums will be correlated using a logical OR operation, that is to say only the trapezium with the highest value will be interpreted for each gray value.

The four cases mentioned above will now be explained with reference to the example of FIG. 7. FIG. 7 shows two gray-value histograms I (solid) and II (dashed), which correspond to the two images or image series to be fusioned. Three trapeziums 11 are furthermore highlighted, the solid trapezium 11 being assigned with respect to the histogram I and the two shaded trapeziums 11 being assigned to the histogram II. The solid trapezium 11 identifies the gray-value range from 100 to 1,000 of the histogram I (and therefore of the image or the image series I), the left-hand of the two shaded trapeziums 11 defines the gray-value range from 900 to 1,700 of the histogram II (and therefore of the image or the image series II), and the right-hand shaded trapezium defines the gray value from 1,400 to 2,000 of the histogram II.

For the fusioned representation, such a modification now signifies the following:

In the gray-value range from 0 to 100, there is no trapezium in either of the histograms I, II. Therefore, no gray values from either image will be drawn in the fusioned representation if they lie in the range from 0 to 100. This corresponds to case 1.

The gray-value range from 100 to 900 is identified only by the solid trapezium 11. The gray values from 100 to 900 of the histogram or image I are hence drawn in full, unmixed intensity (this corresponds to case 2 above).

The gray-value range from 900 to 1,000 is identified both by the solid trapezium 11 and by the left-hand shaded trapezium 11. In this range, the gray values of the histogram I and of the histogram II will be mixed. The alpha-value, that is to say the mixing ratio, is obtained for each gray value of this subrange from the quotient of the trapezium heights at this point. This corresponds to case 3 above. In this range, there is therefore a variable alpha-value which, starting from the gray values 900, favors the gray values of the histogram I, but then changes in such a way that the gray values of the histogram II are favored toward the gray value 1,000.

The gray-value range from 1,000 to 1,400 is identified only by the left-hand shaded trapezium 11. These gray values of the histogram or image II are hence drawn in full, unmixed intensity (corresponding to case 2).

The gray-value range from 1,400 to 1,700 is identified by the shaded trapeziums 11, which overlap there and are both assigned to the histogram II. This involves the case 4 described above. The right-hand shaded and smaller trapezium 11 has no influence on the fusioned representation. All gray values of this range are drawn with full intensity, that is to say unmixed.

Finally, the gray-value range from 1,700 to 2,000 is identified by the right-hand shaded trapezium III. The gray values from 1,700 to 2,000 of the histogram II are also drawn in full, unmixed intensity here (corresponding to case 2).

In summary, it may be stated that the invention provides the possibility of arbitrarily modifying the gray-value histograms of two images or image series to be fusioned, so that a meaningful fusion representation can be generated. If, after highlighting of a marking or after an arbitrary modification of one or both histograms, the fusion result is represented online in parallel on the monitor, the user immediately has the opportunity to observe and check the fusion, and to readily carry out new modifications.

Finally, it should be pointed out that the fusioned representation may take place in various ways. On the one hand, as mentioned, genuine alpha blending and threshold fusion may take place. On the other hand, it is possible to represent the separate modified images or image series, for example, in alternation and quasi flashing, so that exact allocation of individual image points to each respective image or image series is possible. It is also conceivable to slide the two images over one another in alternation. Finally, it is also conceivable for the device 2 to be designed in such a way that two modified images or image series are rotated by a particular angle and represented somewhat offset in relation to one another on the monitor 3, so that a quasi three-dimensional representation is possible on the basis of the stereo effect.

We claim:

1. A device for generating fusion images by fusing two images, comprising:
   an image-processing computation unit for fusing the two images; and
   a monitor connected to said image-processing computation unit for image output, a gray-value histogram being displayable on the monitor for each image of the two images to be fusioned,
   said device being designed in such a way that, in each said gray-value histogram of the two images to be fusioned, one or more gray-value ranges can be selected by user-controlled highlighting of one or more markings on the monitor, as well as for generating the fusion image with the aid of the selected gray-value ranges.

2. The device as claimed in claim 1, wherein a geometrical shape can be highlighted in the gray-value histogram as the marking.

3. The device as claimed in claim 2, wherein a rectangle or a trapezium can be highlighted in the gray-value histogram as the geometrical shape.

4. The device as claimed in claim 1, wherein a selected gray-value range can be shifted inside the gray-value histogram.

5. The device as claimed in claim 4, wherein, in the event of a shift of the selected gray-value range into a range of the gray-value histogram in which there are no gray values, only the gray values of the shifted gray-value range can be taken into account in the fusion.

6. The device as claimed in claim 4, wherein, in the event of a shift of the selected gray-value range into a range of the gray-value histogram in which gray values are already present, the existing gray values are overwritten by those of the shifted gray-value range.

7. The device as claimed in claim 4, wherein, in the event of a shift of the selected gray-value range into a range of the gray-value histogram in which gray values are already present, the existing gray values are mixed with those of the shifted gray-value range.

8. The device as claimed in claim 1, wherein rescaling of the selected gray-value range is possible by means of the markings which can be highlighted.

9. The device as claimed in claim 8, wherein a highlighted geometrical shape, in particular a rectangle or a trapezium, can have its height, varied for the rescaling.

10. The device as claimed in claim 1, wherein the gray-value histograms of both images to be fusioned can be displayed on the monitor.

11. The device as claimed in claim 10, wherein at least one marking can be highlighted in each of the two gray-value histograms.

12. The device as claimed in claim 10, wherein, in the event of a marking highlighted in only one gray-value histogram, only the gray values of the selected range of the specific image can be represented in the fusion image which can be output.

13. The device as claimed in claim 11, wherein, in the event of markings highlighted in both gray-value histograms, the respective gray values of the respectively marked gray-value ranges can be represented in the fusion image, so long as the ranges do not overlap.

14. A device for generating fusion images by fusing two images, comprising:
   an image-processing computation unit for fusing the two images; and
   a monitor connected to said image-processing computation unit for image output, a gray-value histogram being displayable on the monitor for each image of the two images to be fusioned,
   said device being designed in such a way that, in each said gray-value histogram of the two images to be fusioned, one or more gray-value ranges can be selected by user-controlled highlighting of one or more markings on the monitor, as well as for generating the fusion image with the aid of the selected gray-value ranges, wherein said gray-value histograms of both images to be fusioned can be displayed on the monitor,
   wherein in the event of a given overlap of two gray-value ranges marked on the two gray-value histograms, gray-value mixed values can be generated from the gray values existing in the overlap range, and these can be output in the fusion image,
   wherein the gray-value histograms of both images to be fusioned can be displayed on the monitor and
   wherein in the event of a given overlap of two gray-value ranges marked on the gray-value histograms, gray-value mixed values can be generated from the gray values existing in the overlap range, and these can be output in the fusion image.

15. The device as claimed in claim 14, wherein, in the event of overlapping, preferably trapezoidal markings, the weighting of the respective individual gray values to be mixed is dependent on the ratio of the two trapezium sides in the overlap range at the respective gray value.

16. A device for generating fusion images by fusing two images, comprising:
   an image-processing computation unit for fusing the two images; and a monitor connected to said image-processing computation unit for image output, a gray-value histogram being displayable on the monitor for each image of the two images to be fusioned, said device being designed in such a way that, in each said gray-value histogram of the two images to be fusioned, one or more gray-value ranges can be selected by user-controlled highlighting of one or more markings on the monitor, as well as for generating the fusion image with the aid of the selected gray-value ranges, wherein said gray-value histograms of both images to be fusioned can be displayed on the monitor, wherein in the event of a given overlap of two gray-value ranges marked on the two gray-value histograms, gray-value mixed values can be generated from the gray values existing in the overlap range, and these can be output in the fusion image, wherein the gray-value histograms of both images to be fusioned can be displayed on the monitor and wherein in the event of two overlapping gray-value ranges marked on the same gray-value histogram, the gray values of the overlap range can be represented unmixed.

17. The device as claimed in claim 1, wherein, in at least one of the first and second image which can be displayed on the monitor, it is possible to select an image section whose gray-value histogram can subsequently be displayed on the monitor and can be modified and can be fusioned with a corresponding image section of the respective other image.

18. The device as claimed claim 1, wherein a first and a second image to be fusioned are rotated relative to one another by an angle of from 4° to 10°, in particular from 6° to 8°, and can be output offset by a few centimeters intermittently on the monitor.

19. The device as claimed in claim 18, wherein the first and/or the second image is a fusion image generated from a previous fusion of two images weighted arbitrarily with respect to one another.

20. The device as claimed in claim 1, wherein two images to be fusioned can be represented in alternation on the monitor.

21. The device as claimed in claim 1, wherein two images to be fusioned can be slid over one another in alternation on the monitor.

22. The device as claimed in claim 20, wherein the frequency of the alternating image representation and/or the slid-over direction can be selected.

23. The device as claimed in claim 20, wherein the alternating representation can be stopped at an arbitrary time while retaining the current representation.

* * * * *